US012773840B2

(12) United States Patent
Saito et al.

(10) Patent No.: US 12,773,840 B2
(45) Date of Patent: Oct. 27, 2026

(54) LAMINATED GLASS FOR AUTOMOBILE WINDOW AND AUTOMOBILE

(71) Applicant: AGC Inc., Tokyo (JP)

(72) Inventors: Isao Saito, Tokyo (JP); Akihiro Shibata, Tokyo (JP); Masao Fukami, Tokyo (JP)

(73) Assignee: AGC INC., Tokyo (JP)

( * ) Notice: Subject to any disclaimer, the term of this patent is extended or adjusted under 35 U.S.C. 154(b) by 110 days.

(21) Appl. No.: 18/817,130

(22) Filed: Aug. 27, 2024

(65) Prior Publication Data

US 2024/0416625 A1 Dec. 19, 2024

Related U.S. Application Data

(63) Continuation of application No. PCT/JP2023/007860, filed on Mar. 2, 2023.

(30) Foreign Application Priority Data

Mar. 3, 2022 (JP) ................................ 2022-032932

(51) Int. Cl.
*B32B 17/10* (2006.01)
*B32B 3/30* (2006.01)

(52) U.S. Cl.
CPC .......... *B32B 17/10366* (2013.01); *B32B 3/30* (2013.01); *B32B 17/10036* (2013.01)

(58) Field of Classification Search
CPC ................ B32B 17/10366; B32B 3/30; B32B 17/10036
USPC ........................................................... 428/43
See application file for complete search history.

(56) References Cited

U.S. PATENT DOCUMENTS 3,801,423 A * 4/1974 Van Laethem ... B32B 17/10981 428/161
2006/0138798 A1 6/2006 Oehrlein
2015/0132538 A1* 5/2015 Cleary .............. B32B 17/10137 428/141
2015/0375949 A1* 12/2015 Kanemaru ............ B65H 9/002 271/228

(Continued)

FOREIGN PATENT DOCUMENTS

DE 10 2011 080 426 A1 2/2013
JP 6065221 B2 1/2017

(Continued)

OTHER PUBLICATIONS

DE 102011080426 A1 Machine Transilated (Year: 2013).*

(Continued)

*Primary Examiner* — Betelhem Shewareged
(74) *Attorney, Agent, or Firm* — Foley & Lardner LLP

(57) ABSTRACT

A laminated glass for an automobile window, the laminated glass including a first glass plate, an intermediate film, and a second glass plate in this order from outside of a vehicle to inside of the vehicle, wherein a plurality of heterogeneous regions formed by a laser are provided in a vicinity of a surface of the first glass plate, a surface of the second glass plate, or the surfaces of the first glass plate and the second glass plate, the surfaces facing the inside of the vehicle, being spaced apart in a plane direction, a ratio of a length in a thickness direction to a circle equivalent diameter in plan view of the heterogeneous regions is 2 or more and 1,000 or less.

21 Claims, 7 Drawing Sheets

(56) References Cited

U.S. PATENT DOCUMENTS

2024/0416625 A1* 12/2024 Saito ......................... B32B 3/30

FOREIGN PATENT DOCUMENTS

| | | | |
|---|---|---|---|
| JP | 2017-213928 | A | 12/2017 |
| WO | WO-2019/245819 | A1 | 12/2019 |
| WO | WO-2021/180954 | A1 | 9/2021 |

OTHER PUBLICATIONS

International Searching Authority, "International Search Report," issued in connection with International Patent Application No. PCT/JP2023/007860, dated May 23, 2023.

International Searching Authority, "Written Opinion," issued in connection with International Patent Application No. PCT/JP2023/007860, dated May 23, 2023.

Nuss et al., "Guidelines for pedestrian friendly windscreen designs considering probabilistic fracture behavior", Paper No. 15-0319, 24th International Technical Conference on the Enhanced Safety of Vehicles (ESV), Gothenburg, Sweden (2015).

* cited by examiner

LAMINATED GLASS FOR AUTOMOBILE WINDOW AND AUTOMOBILE

CROSS-REFERENCE TO RELATED APPLICATION

The present application is a continuation application of International Application No. PCT/JP2023/007860, filed Mar. 2, 2023, which claims priority to Japanese Patent Application No. 2022-032932 filed Mar. 3, 2022. The contents of these applications are incorporated herein by reference in their entirety.

BACKGROUND OF THE INVENTION

1. Field of the Invention

The invention relates to a laminated glass for an automobile window, and to an automobile.

2. Description of the Related Art

There is a need for a technology to reduce, when an automobile collides with a person such as a pedestrian, an impact on the person. For example, Japanese Unexamined Patent Application Publication No. 2017-213928 discloses a technology to reduce an impact on a person when an impact is applied around a cowl louver and a windshield, by separating the rear end of the cowl louver connected by a molding from the front end of the windshield.

SUMMARY OF THE INVENTION

Problems to be Solved by the Invention

A laminated glass for automobile windows, such as windshields, is required to break properly in order to reduce, when an automobile collides with a person such as a pedestrian, the impact on the person. For example, a laminated glass for automobile windows is required to have a head injury criterion (HIC) of a desired value or less. A laminated glass for automobile windows is also required to enable an occupant of the vehicle to see the outside of the vehicle through the laminated glass for automobile windows. An object of an aspect of the present invention is to reduce an impact on a person when an automobile collides with the person, while not obstructing the visibility of the outside of the automobile by the occupant of the automobile.

Means for Solving the Problem

According to an aspect of the present disclosure, a laminated glass for an automobile window, the laminated glass including a first glass plate, an intermediate film, and a second glass plate in this order from outside of a vehicle to inside of the vehicle, is provided. A plurality of heterogeneous regions formed by a laser are provided in a vicinity of a surface of the first glass plate, a surface of the second glass plate, or the surfaces of the first glass plate and the second glass plate, the surfaces facing the inside of the vehicle, being spaced apart in a plane direction a ratio of a length in a thickness direction to a circle equivalent diameter in plan view of the heterogeneous regions is 2 or more and 1,000 or less.

According to another aspect of the present disclosure, a laminated glass for an automobile window, the laminated glass including a first glass plate, an intermediate film, and a second glass plate in this order from outside of a vehicle to inside of the vehicle, is provided. A plurality of heterogeneous regions formed by a laser are provided in a vicinity of a surface of the first glass plate, a surface of the second glass plate, or the surfaces of the first glass plate and the second glass plate, the surfaces facing the inside of the vehicle, being spaced apart in a plane direction, a ratio of a length in a longitudinal direction to a diameter of a cross section perpendicular to the longitudinal direction of the heterogeneous regions is 2 or more and 1,000 or less.

Effects of the Invention

According to an aspect of the present disclosure, it is possible to provide a technology that reduces an impact on a person when an automobile collides with the person, while not obstructing the visibility of the outside of the automobile by the occupant of the automobile.

BRIEF DESCRIPTION OF THE DRAWINGS

Other objects and further features of the present disclosure will be apparent from the following detailed description when read in conjunction with the accompanying drawings, in which.

DESCRIPTION OF THE EMBODIMENT

Figure 1:
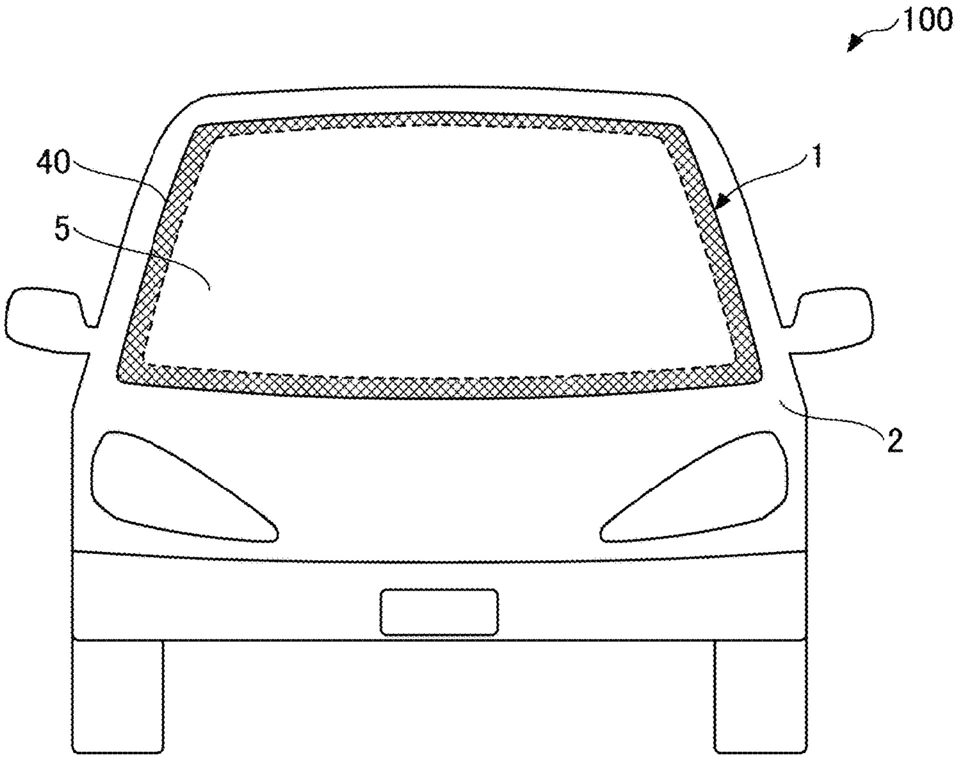
FIG. 1 is a front view of an automobile with a laminated glass according to an embodiment of the present invention.

In the following, embodiments will be described with reference to the drawings. In each of the drawings, the same or corresponding components are denoted by the same reference numerals, and the description thereof may be omitted.

FIG. 1 illustrates an example in which a laminated glass 1 for automobile windows produced according to an embodiment of the present invention is used as a window glass of an automobile 100. In the example of FIG. 1, the laminated glass 1 for automobile windows (hereinafter also simply referred to as a laminated glass) is a glass mounted on an opening (a window) in the front of a vehicle body 2 of the automobile 100, that is, a front windshield. However, the laminated glass 1 may be a window glass other than the front windshield, for example, a side glass, a rear glass, or a roof glass.

Figure 2:
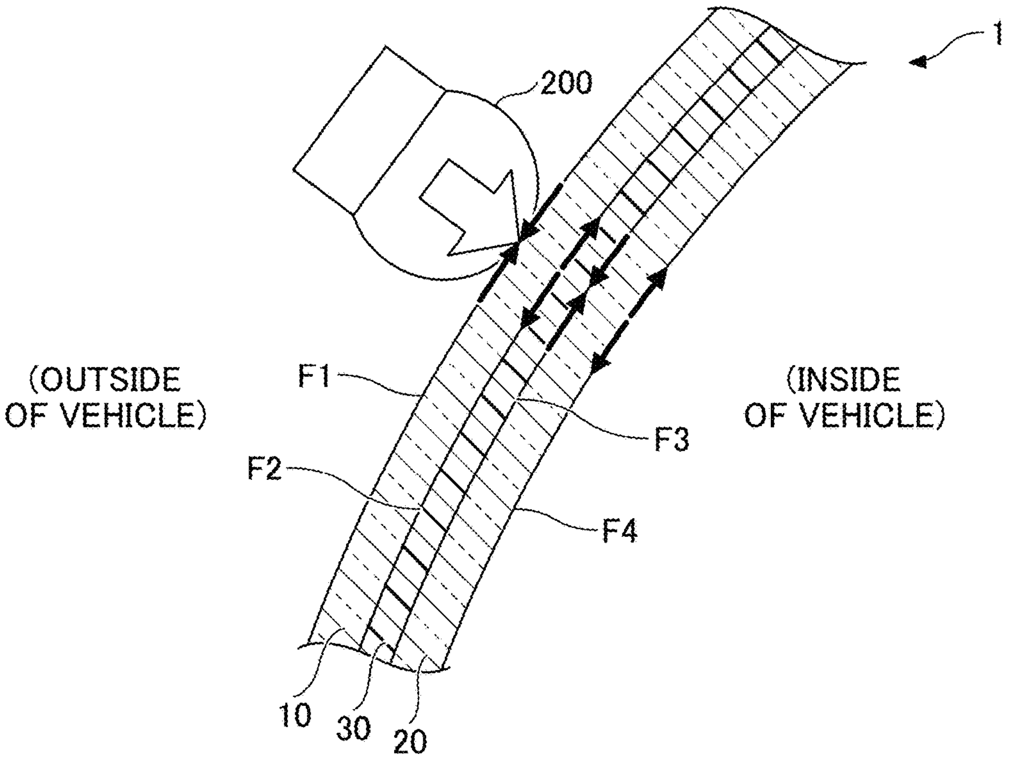
FIG. 2 is a cross-sectional view of the laminated glass illustrated in FIG. 1 and is a diagram for explaining cracking of the laminated glass when an automobile collides with a person.

FIG. 2 is a partial cross-sectional view of the laminated glass 1 illustrated in FIG. 1. As illustrated in FIG. 2, the laminated glass 1 includes a first glass plate 10, an intermediate film 30, and a second glass plate 20 in this order from the outside to the inside of the vehicle. The first glass plate 10 and the second glass plate 20 are joined by the intermediate film 30. As illustrated in FIG. 2, the first glass plate 10 has a first surface F1 facing the outside of the vehicle and a second surface F2 facing the inside of the vehicle, and the second glass plate 20 has a third surface F3 facing the outside of the vehicle and a fourth surface F4 facing the inside of the vehicle.

The material constituting the first glass plate 10 and the second glass plate 20 (hereinafter also referred to together simply as glass plates) in the laminated glass 1 is preferably inorganic glass. Examples of the inorganic glass include soda lime silicate glass, aluminosilicate glass, borate glass, lithium aluminosilicate glass, borosilicate glass, and the like. The method of forming the glass plate made of the inorganic glass is not particularly limited, but the glass plate is preferably glass (float glass) formed by a float method, for example.

The glass plate used for manufacturing the laminated glass 1 may be unreinforced glass (raw glass). The unreinforced glass is glass obtained by molding molten glass into a plate shape and slowly cooling the molten glass, and is not subjected to a strengthening treatment such as an air-cooling strengthening treatment or a chemical strengthening treatment. By using the unreinforced glass, even when the glass cracks due to impact, the entire surface will not be shattered into small pieces, ensuring the visibility for the occupant even in the event of an accident.

The thickness of the first glass plate 10 and the second glass plate 20 may be the same or different from each other. The thickness of the first glass plate 10 may be 1.1 mm or more and 3.5 mm or less. The thickness of the second glass plate 20 may be 0.5 mm or more and 2.3 mm or less. The overall thickness of the laminated glass 1 may be 2.3 mm or more and 8.0 mm or less. The configurations (material constituting the glass plate, manufacturing method of the glass plate, and the like) of the first glass plate 10 and the second glass plate 20 may be the same or different from each other.

The material of the intermediate film 30 is not particularly limited, but is preferably a thermoplastic resin. Examples of the material of the intermediate film 30 include conventional thermoplastic resins such as plasticized polyvinyl acetal resin, plasticized polyvinyl chloride resin, saturated polyester resin, plasticized saturated polyester resin, polyurethane resin, plasticized polyurethane resin, ethylene-vinyl acetate copolymer resin, ethylene-ethyl acrylate copolymer resin, cycloolefin polymer resin, and ionomer resin. A resin composition containing a modified block copolymer hydride disclosed in Japanese Patent No. 6065221 can also be suitably used. Among these, the plasticized polyvinyl acetal resin is preferably used because of its excellent balance of various properties such as transparency, weather resistance, strength, adhesive strength, penetration resistance, impact energy absorption, moisture resistance, heat shielding, and sound insulation. The above-mentioned thermoplastic resin may be used alone or in combination of two or more. The term "plasticized" in the plasticized polyvinyl acetal resin means that it is plasticized by the addition of a plasticizer. The same applies to other plasticized resins.

The intermediate film 30 may be a resin containing no plasticizer, such as an ethylene-vinyl acetate copolymer resin, for example. Examples of the polyvinyl acetal resin include a polyvinyl formal resin obtained by reacting polyvinyl alcohol (PVA) with formaldehyde, a polyvinyl acetal resin in a narrow sense obtained by reacting PVA with acetaldehyde, a polyvinyl butyral resin (PVB) obtained by reacting PVA with n-butyraldehyde, and the like. In particular, PVB is a preferred material because of its excellent balance of various properties such as transparency, weather resistance, strength, adhesive strength, penetration resistance, impact energy absorption, moisture resistance, heat shielding, and sound insulation. The above-mentioned resin may be used alone or in combination of two or more.

The intermediate film 30 may have either a single-layer structure or a multi-layer structure. The intermediate film 30 may have a function other than adhesion. For example, the intermediate film 30 may have one or more layers selected from a sound insulating layer, a colored transparent layer, an ultraviolet ray cutting layer, an infrared ray cutting layer, and the like.

The thickness of the intermediate film 30 may be 0.5 mm or more from the viewpoint of adhesion. The thickness of the intermediate film 30 may be 3 mm or less from the viewpoint of lightness and handleability. The thickness of the intermediate film 30 may be constant or may vary depending on the position.

The method of manufacturing the laminated glass 1 includes, for example, steps (a) to (c) below. (a) The first glass plate 10 and the second glass plate 20 are stacked together with the intermediate film 30 interposed therebetween to produce a laminate. (b) The laminate is housed in a container such as a rubber bag, and the inside of the container is heated while being depressurized, and the first glass plate 10 and the second glass plate 20 are bonded together with the intermediate film 30. The internal pressure of the container is, for example, −100 kPa to −65 kPa based on atmospheric pressure. The heating temperature of the container is, for example, 70° C. to 110° C. (c) The laminate taken out from the container is pressure-bonded at a pressure of 0.6 MPa to 1.3 MPa while being heated at 100° C. to 150° C. For the pressure-bonding, for example, an autoclave is used. The method of manufacturing the laminated glass 1 may be any general method and need not necessarily include the step (c) above.

As illustrated in FIG. 2, the laminated glass 1 may be curved in such a way that the whole or a part thereof is convex to the outside of the vehicle. In this case, the first glass plate 10 and the second glass plate 20 can be bent by bending to a desired predetermined curvature in one or two directions, respectively. The laminated glass 1 illustrated in FIG. 1 has a double curvature curved in the longitudinal direction and the vertical direction of the automobile, but may be a single curvature curved only in the longitudinal direction or the vertical direction. The radius of curvature of the laminated glass 1 may be 200 mm or more and 300,000 mm or less.

The first glass plate 10 and the second glass plate 20 are bent before the step (a). The bending is performed in a state where the glass is softened by heating. The heating temperature of the glass at the time of the bending is, for example, 550° C. to 700° C. The first glass plate 10 and the second glass plate 20 may be bent separately or stacked and simultaneously bent. The bending may include gravity forming or press forming, and may include both.

Figure 3:
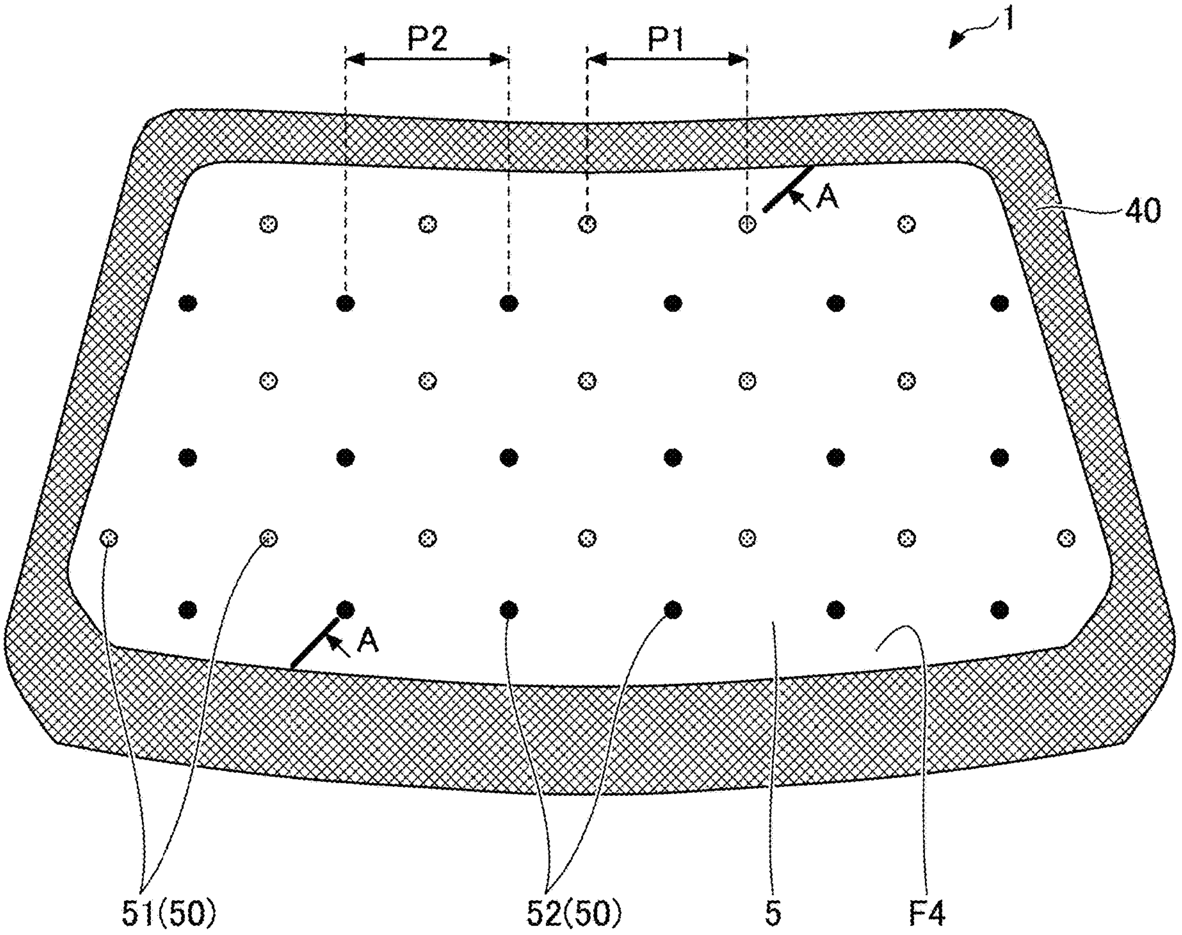
FIG. 3 is a plan view of the laminated glass illustrated in FIG. 1, viewed from inside of a vehicle.

A shielding layer or a light shielding layer 40 may be provided on the peripheral edge of the laminated glass 1 for protecting a sealant or the like that adheres and holds the laminated glass 1 to the vehicle body (FIGS. 1 and 3). The shielding layer 40 can be formed, for example, by applying a ceramic color paste of a low lightness color such as black, gray, or brownish, that contains a fusible glass frit containing a black pigment, and baking the paste. The shielding layer 40 may be formed on one or more of the second surface F2, the third surface F3, and the fourth surface F4 (FIG. 2) of the laminated glass 1, preferably on the peripheral edge of at least one of the second surface F2 and the fourth surface F4 (FIG. 2). The shielding layer 40 may be provided over a distance of 10 mm or more and 300 mm or less from the peripheral edge of the glass plate. In the present embodiment, a region excluding a region (also referred to as a light shielding region) covered with the shielding layer 40 formed on the laminated glass is a transparent region 5. The transparent region 5 is a region in which an occupant of the automobile 100 can see the outside of the automobile 100. In other words, the occupant of the automobile 100 can see the outside through the transparent region 5.

As described above, the laminated glass 1 for automobile windows is required to break properly in order to reduce, when an automobile collides with a person such as a pedestrian or a cyclist, the impact on the person. For example, the laminated glass 1 is required to have a head injury criterion (HIC) of a desired value or less (for example, 1,000 or less, preferably 650 or less).

Here, a description will be given of how the laminated glass 1 cracks upon impact with a person. As illustrated in FIG. 2, upon impact with a person 200, the laminated glass 1 is pushed from the outside of the vehicle toward the inside of the vehicle. As a result, tensile stress is generated on the second surface F2 of the first glass plate 10 facing the inside of the vehicle, and the first glass plate 10 cracks starting from a heterogeneous region (imperfection) in the vicinity of the second surface F2. Further, tensile stress is also generated on the fourth surface F4 of the second glass plate 20 facing the inside of the vehicle, and the second glass plate 20 cracks starting from a heterogeneous region (imperfection) in the vicinity of the fourth surface F4. Thus, in both the first glass plate 10 and the second glass plate 20, the cracking (fracture) begins on the surfaces facing the inside of the vehicle, and subsequently the cracking develops from the inside to the outside of the vehicle.

In the laminated glass 1 according to the present embodiment, the first glass plate 10 and/or the second glass plate 20 have a plurality of heterogeneous regions formed spaced apart in the plane direction of the glass plate at a position in the vicinity of the surface facing the inside of the vehicle, that is, at a position on the surface facing the inside of the vehicle, or at a position inside the first glass plate 10 and/or the second glass plate 20 and a depth position close to the surface facing the inside of the vehicle. In other words, a plurality of heterogeneous regions are formed at intervals in the plane direction in a region close to the second surface F2 inside the first glass plate 10, and/or a plurality of heterogeneous regions (or heterogeneous phases) are formed at intervals in the plane direction in a region close to the fourth surface F4 inside the second glass plate 20. The heterogeneous regions in the present embodiment are formed by heterogenization by irradiation with laser beam (described later).

In the present specification, the term "heterogeneous region (or heterogeneous phase)" means a minute region in which glass is locally heterogenized in a glass plate, and the heterogenization means locally changing physical and/or chemical properties. In the present specification, the heterogeneous region may be a region in which one or more properties of virtual temperature, density, refractive index, stress, crystalline state, composition, ionic valence, and cavity formation are locally changed by irradiation with laser beam (described later). Therefore, the heterogenized region may be a region including cracks, dents, bubbles, and the like. Further, the heterogeneous region may be, for example, a region in which the virtual temperature is higher than the value before the heterogenization, specifically, a region in which the virtual temperature has changed by 30° C. or more from the value before the heterogenization. The virtual temperature can be evaluated by spectroscopic evaluation such as Raman spectroscopy or infrared spectroscopy. The heterogeneous region may be a region in which the refractive index is lower or higher than the value before the heterogenization, for example, a region in which the refractive index has changed by 0.1% or more with the value before the heterogenization being 100%.

In the present embodiment, the heterogeneous region is formed at a position close to the surface, among the surfaces of the glass plate, facing the inside of the vehicle on which cracking occurs first when the laminated glass 1 receives an impact from the outside. Therefore, the heterogeneous region serves as a starting point of cracking, making it easier for the glass plate to start cracking, thereby facilitating proper cracking of the laminated glass 1. In addition, because a plurality of heterogeneous regions 50 are provided in the vicinity of the surface facing the inside of the vehicle and spaced apart in the plane direction, a surrounding compressive stress generated against the tensile stress in the heterogeneous region 50 appears on the surface (the surface facing the inside of the vehicle), and a continuous tensile stress is generated over the entire surface between the compressive stresses appeared on the surface, thereby reducing the strength of the surface as a whole and making the surface susceptible to cracking. Therefore, even when an automobile collides with a person, the laminated glass 1 can absorb the impact by cracking, and the impact sustained by the person can be reduced. In the present embodiment, the difference in the plane stress value between the heterogeneous region and the peripheral region in the surface facing the inside of the vehicle (the second surface F2 and/or the fourth surface F4) of the glass plate can be 0.2 MPa or more and 20 MPa or less.

In the present embodiment, as long as the heterogeneous regions are formed in either of the first glass plate 10 and the second glass plate 20, the effect that the laminated glass 1 can break properly as described above can be obtained. However, when the heterogeneous regions are formed at least in the side of the second glass plate 20 that is not in contact with the intermediate film 30 and is exposed to the outside (the inside of the vehicle), the laminated glass 1 can be effectively weakened. Further, when the heterogeneous regions are formed in both of the first glass plate 10 and the second glass plate 20, each of the first glass plate 10 and the second glass plate 20 is likely to crack from the inside of the vehicle, so that the laminated glass 1 as a whole is likely to break properly and cracks are likely to develop in the thickness direction, which is preferable.

FIG. 3 is a plan view of the laminated glass 1 viewed from the fourth surface F4. The laminated glass 1 has a plurality of heterogeneous regions 50, 50, . . . in the glass plate. In the example illustrated in FIG. 3, the heterogeneous regions 50, 50, . . . include a plurality of first heterogeneous regions 51, 51, . . . that are spaced apart in the plane direction and distributed over the first glass plate 10, and a plurality of second heterogeneous regions 52, 52, . . . that are spaced apart in the plane direction and distributed throughout the second glass plate 20. The first heterogeneous regions 51, 51, . . . and the second heterogeneous regions 52, 52, . . . are respectively arranged in a grid pattern in plan view, but the arrangement is not limited to the grid pattern and may be a staggered pattern, for example. In the example illustrated in FIG. 3, the first heterogeneous region 51 and the second heterogeneous region 52 do not overlap in plan view, but part or all of the first heterogeneous regions 51, 51, . . . may overlap with the second heterogeneous regions 52, 52, . . . . Further, in the example illustrated in FIG. 3, the first heterogeneous regions 51, 51, . . . and the second heterogeneous regions 52, 52, . . . (together, heterogeneous regions 50, 50, . . . ) are in a staggered pattern in plan view, but the arrangement is not limited to the staggered pattern and may be a grid pattern, for example.

A pitch P1 of the first heterogeneous regions 51, 51, . . . is preferably 1 mm or more and 200 mm or less, more preferably 10 mm or more and 100 mm or less, and still more preferably 20 mm or more and 100 mm or less. The pitch P1 is a distance between the center position of one first heterogeneous region 51 and the center position of another first heterogeneous region 51 arranged closest to each other. The pitch P1 may be constant over the transparent region 5 or may vary depending on the position, and in the latter case, the pitch P1 is an average value. By setting the pitch P1 to 1 mm or more, it is possible to minimize the phenomenon that the first heterogeneous regions 51, 51 are too close to each other and the compressive stress generated on the surface is continuously distributed in the plane direction, causing the glass plate to be less susceptible to cracking. By setting the pitch P1 to 200 mm or less, the starting point of the cracking are suitably distributed on the surface facing the inside of the vehicle (the second surface F2) of the first heterogeneous regions 51, 51, . . . , and the laminated glass 1 is likely to break properly when an impact is applied to the laminated glass 1 from the outside of the vehicle.

A pitch P2 of the second heterogeneous region 52 is similar to the pitch P1 of the first heterogeneous regions 51, 51, . . . , and may preferably be 1 mm or more and 200 mm or less, more preferably 10 mm or more and 100 mm or less, and still more preferably 20 mm or more and 100 mm or less. The effect of setting the pitch P2 of the second heterogeneous region 52 to 1 mm or more and 200 mm or less is also similar to the effect regarding the surface facing the inside of the vehicle with respect to the pitch P1.

Figure 4:
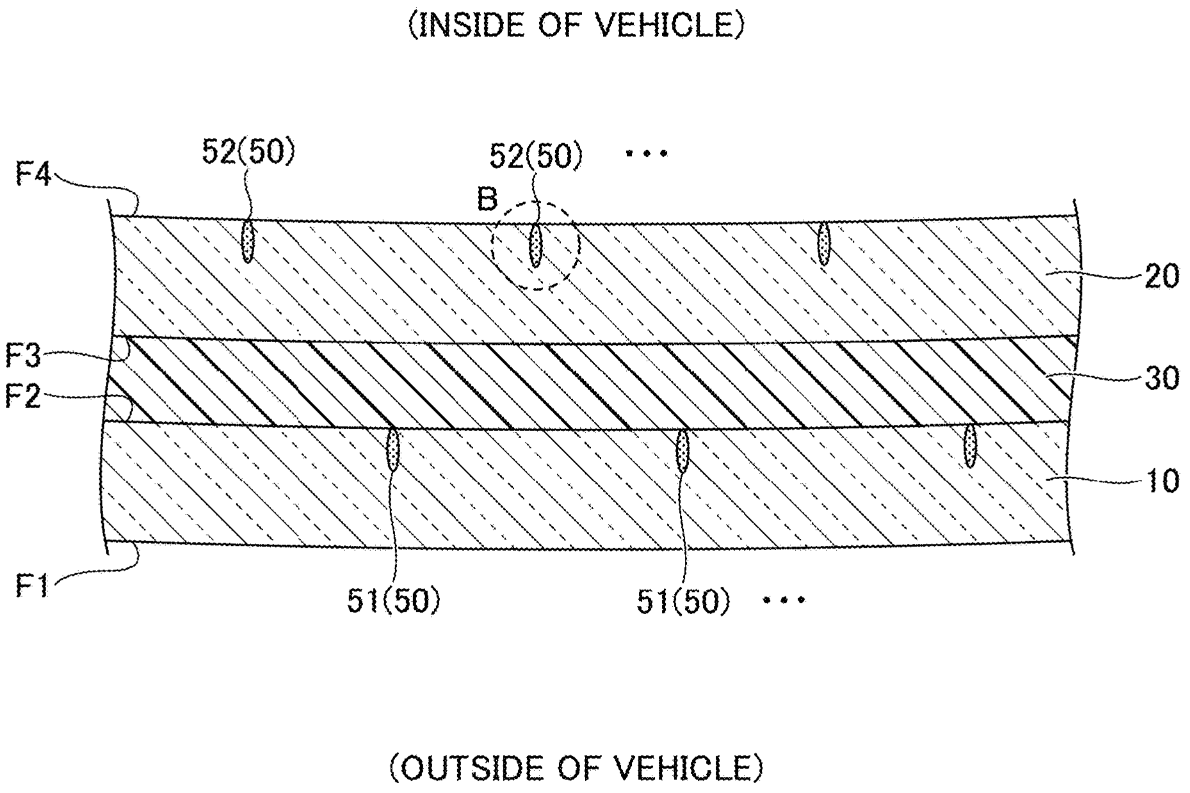
FIG. 4 is an enlarged view of a cross section taken along a line A-A of FIG. 3 and is a diagram for explaining a cross-sectional shape of heterogeneous regions.
Figure 5A:
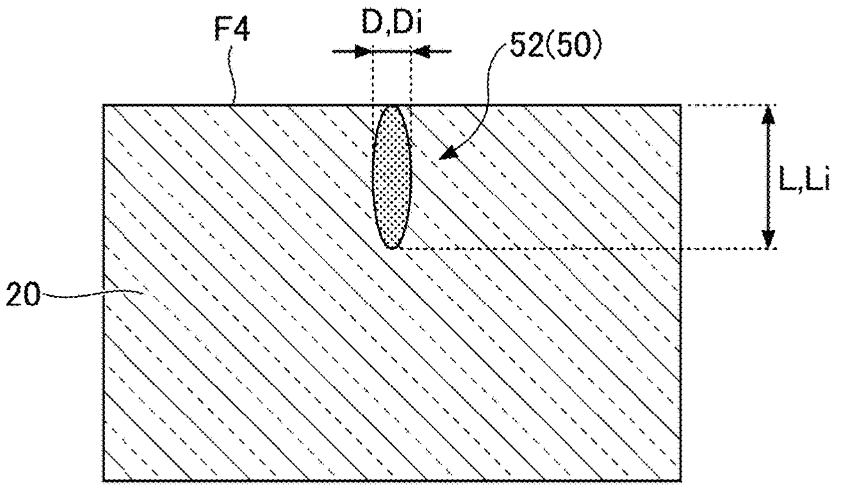
FIG. 5A is an enlarged view of a part B of FIG. 4.

FIG. 4 is a partially enlarged view of a cross section along a line A-A of the laminated glass 1 illustrated in FIG. 3. FIG. 5A is an enlarged view of a part B including one heterogeneous region 50 (second heterogeneous region 52) in FIG. 4. As illustrated in FIG. 4, the first heterogeneous regions 51, 51, . . . are formed in the vicinity of the second surface F2 (the surface facing the inside of the vehicle). The second heterogeneous regions 52, 52, . . . are formed in the vicinity of the fourth surface F4 (the surface facing the inside of the vehicle). In other words, the position of the heterogeneous region 50 (the first heterogeneous region 51 or the second heterogeneous region 52) formed in the glass plate in the thickness direction is closer to the surface facing the inside of the vehicle than to the surface facing the outside of the vehicle of the glass plate. When the glass plate is virtually divided at the center position in the thickness direction, the heterogeneous region 50 is preferably included in the range from the center position to the surface facing the inside of the vehicle of the glass plate. The heterogeneous region 50 is preferably not included in the range from the center position to the surface facing the outside of the vehicle of the glass plate.

The heterogeneous region 50 may or may not extend to the surface facing the inside of the vehicle (the second surface F2 or the fourth surface F4) of the glass plate in which the heterogeneous region 50 is formed. That is, the heterogeneous region 50 may or may not appear on the surface facing the inside of the vehicle. However, it is preferable that the heterogeneous region 50 is in contact with the surface facing the inside of the vehicle or the heterogeneous region 50 appears on the surface facing the inside of the vehicle, from the viewpoint that the starting point of the cracking is likely to occur on the surface facing the inside of the vehicle and tensile stress is likely to occur on the surface facing the inside of the vehicle. Meanwhile, from the viewpoint of ensuring the robustness of the laminated glass 1 during normal use without collision, it is preferable that the heterogeneous region 50 does not appear on the surface facing the inside of the vehicle depending on the shape and size of the heterogeneous region 50.

As schematically illustrated in FIG. 5A, the heterogeneous region 50 has a shape that is elongated in the thickness direction. Further, the heterogeneous region 50 may have a cylindrical shape having an axis in the thickness direction of the glass plate or a shape close to it, and may have a larger diameter near the center in the thickness direction and a smaller diameter closer to the surface facing the inside of the vehicle and the surface facing the outside of the vehicle of the glass plate. For example, as illustrated in FIG. 5A, a cross section taken in the thickness direction may have an elliptical shape. Such a shape of the heterogeneous region 50 is caused by a predetermined formation of the heterogeneous region 50 using a laser. Therefore, the heterogeneous region 50 is not limited to having the shape illustrated in FIG. 5A or the like, and can have various configurations depending on laser irradiation conditions or the like.

A length L in the thickness direction of the heterogeneous region 50 (FIG. 5A) is preferably 0.1 μm or more and 2,000 μm or less, more preferably 1 μm or more and 1,000 μm or less, still more preferably 10 μm or more and 1,000 μm or less, still more preferably 50 μm or more and 1,000 μm or less, and particularly preferably 100 μm or more and 1,000 μm or less. When the length L is 0.1 μm or more and 2,000 μm or less, cracks are likely to develop in the thickness direction at the time of collision with a person, and the laminated glass 1 can be effectively weakened, while the robustness as an automobile window and the external visibility can be ensured during normal use without collision. A ratio (L/thickness of glass plate) of the length L to the thickness of the glass plate in which the heterogeneous region 50 is provided is preferably 0.001 or more and 1.0 or less, more preferably 0.01 or more and 0.7 or less, and still more preferably 0.05 or more and 0.7 or less. When the length L is 0.001 or more and 1.0 or less, cracks are likely to develop in the thickness direction at the time of collision with a person, and the laminated glass 1 can be effectively weakened, while the robustness as an automobile window can be ensured during normal use without collision.

A maximum circle equivalent diameter D (FIG. 5A) in plan view of the cross section cut in the plane direction of the heterogeneous region 50 may preferably be 0.01 μm or more and 200 μm or less, more preferably 0.1 μm or more and 200 μm or less, still more preferably 1 μm or more and 200 μm or less, still more preferably 10 μm or more and 200 μm or less, and particularly preferably 20 μm or more and 150 μm or less. When the cross section cut in the plane direction of the heterogeneous region 50 is circular, the maximum circle equivalent diameter D is the maximum diameter of the cross section. When the maximum circle equivalent diameter D is 0.01 μm or more and 200 μm or less, a tensile stress field can be suitably formed on the surface facing the inside of the vehicle of the glass plate, and the function of the heterogeneous region 50 as a starting point of the cracking at the time of collision can be improved, so that the effect that the laminated glass 1 can break properly can be improved, and the visibility of the outside by the occupant of the automobile 100 is not obstructed. The upper limit of the maximum circle equivalent diameter D to be 200 μm is smaller than the size of the sunspot (500 μm) permitted by Japanese Automotive Standards Organization (JASO).

A ratio (L/D) of the length L in the thickness direction to the maximum circle equivalent diameter D of the heterogeneous region 50 may be 2 or more and 1,000 or less, preferably 2.5 or more and 500 or less, more preferably 2.5 or more and 100 or less, still more preferably 3 or more and 100 or less, still more preferably 5 or more and 100 or less, and particularly preferably 10 or more and 50 or less. When the value (L/D) of the heterogeneous region 50 is 2 or more, the effect that the laminated glass 1 can break properly at the time of collision can be improved. When the value (L/D) is 1,000 or less, the robustness as an automobile window in normal use without collision can be ensured. Moreover, the visibility of the outside by the occupant of the automobile 100 is not obstructed.

Further, the length Li of the heterogeneous region 50 in the longitudinal direction (FIGS. 5A to 5C) may be preferably 0.1 μm or more and 2,000 μm or less, more preferably 1 μm or more and 1,000 μm or less, still more preferably 10 μm or more and 1,000 μm or less, still more preferably 50 μm or more and 1,000 μm or less, and particularly preferably 100 μm or more and 1,000 μm or less. By setting the length Li in the longitudinal direction of the heterogeneous region 50 itself to 0.1 μm or more and 2,000 μm or less, cracks are likely to develop in the thickness direction at the time of collision with a person, and the laminated glass 1 can be effectively weakened, while the robustness as an automobile window and the external visibility can be ensured during normal use without collision. The longitudinal direction of the heterogeneous region 50 is the axial direction of the heterogeneous region 50, and may correspond to the direction of irradiation with laser beam when the heterogeneous region is formed.

A diameter Di of the cross section perpendicular to the longitudinal direction of the heterogeneous region 50 (FIGS. 5A to 5C) may be preferably 0.01 μm or more and 200 μm or less, more preferably 0.1 μm or more and 200 μm or less, still more preferably 1 μm or more and 200 μm or less, still more preferably 10 μm or more and 200 μm or less, and particularly preferably 20 μm or more and 150 μm or less. The diameter Di of the heterogeneous region may be a circle equivalent diameter (diameter of a circle having the same area) at a position where a cross section orthogonal to the longitudinal direction of the heterogeneous region 50 is largest. When the shape of the cross section orthogonal to the longitudinal direction of the heterogeneous region 50 is circular, the diameter Di of the heterogeneous region is a diameter at a position where the cross section of the heterogeneous region 50 is largest. By setting the diameter Di of the heterogeneous region 50 itself to 0.01 μm or more and 200 μm or less, a tensile stress field can be suitably formed on the surface facing the inside of the vehicle of the glass plate, and the function of the heterogeneous region 50 as a starting point of the cracking at the time of collision can be improved, so that the effect that the laminated glass 1 can break properly can be improved.

The aspect ratio of the heterogeneous region 50, that is, the ratio (Li/Di) of the length Li in the longitudinal direction to the diameter Di may be 2 or more and 1,000 or less, preferably 2.5 or more and 500 or less, more preferably 2.5 or more and 100 or less, still more preferably 3 or more and 100 or less, still more preferably 5 or more and 100 or less, and particularly preferably 10 or more and 50 or less. When the value (aspect ratio) of the (Li/Di) of the heterogeneous region 50 is 2 or more, the effect that the laminated glass 1 can break properly at the time of collision can be improved. When the value of the (Li/Di) is 1,000 or less, the robustness as an automobile window can be ensured during normal use without collision. Moreover, the visibility of the outside by the occupant of the automobile 100 is not obstructed.

In the example illustrated in FIG. 5A, the length L in the thickness direction of the heterogeneous region 50 is also the length Li in the longitudinal direction of the heterogeneous region 50 itself. The maximum circle equivalent diameter D of the heterogeneous region 50 in plan view is also the diameter Di of the heterogeneous region 50 itself.

Figure 5B:
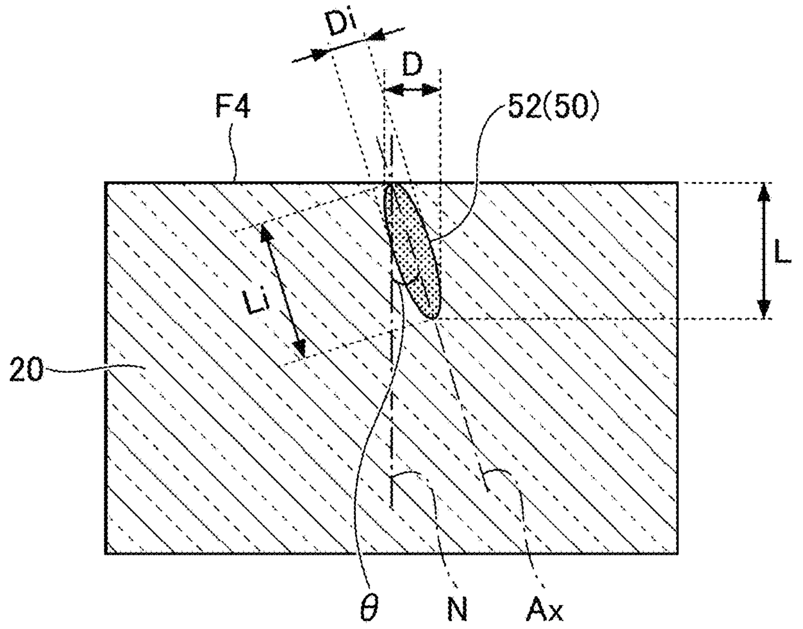
FIG. 5B is a diagram illustrating a tilted heterogeneous region, corresponding to FIG. 5A.

The longitudinal direction of the elongated heterogeneous region 50 may be parallel to the thickness direction (the normal direction when the glass plate is curved) as illustrated in FIG. 5A, or may be at an angle of more than 0° and 60° or less as illustrated in FIG. 5B. In the present specification, the term "parallel" refers to angles that are within 10° of being perfectly parallel.

FIG. 5B illustrates another example of the heterogeneous region in which the longitudinal direction or the direction of an axis Ax of the heterogeneous region 50 forms an angle θ with respect to the thickness direction or a normal N. Such a tilted heterogeneous region can be formed, for example, by tilting the angle of laser irradiation with respect to the direction normal to the glass plate surface. The angle of laser irradiation can be adjusted, for example, by using a scanning device such as a galvano-scanner.

From the viewpoint of effective weakening of the laminated glass 1, the longitudinal directions of the plurality of heterogeneous regions 50 may preferably be aligned parallel to the thickness direction or to the normal direction. From the viewpoint of improving the visibility of outside of the automobile by scattering external light incident on the heterogeneous regions in various directions, the longitudinal directions of the plurality of heterogeneous regions 50 may preferably not be aligned but may be different, and more preferably the angle θ may be distributed within a range of more than 0° and 60° or less. As another example, from the viewpoint of ensuring the visibility by making the heterogeneous regions themselves less visible, the longitudinal directions of the elongated heterogeneous regions 50 may be parallel to the horizontal direction when assembled in the automobile. Further, the longitudinal directions may also be parallel to the direction along the line of sight toward the laminated glass 1 from the eye position of the occupant, in the state of being assembled to the automobile. Accordingly, the size of the heterogeneous regions in the view of the occupant can be minimized, thereby reducing the influence on the visibility.

Figure 5C:
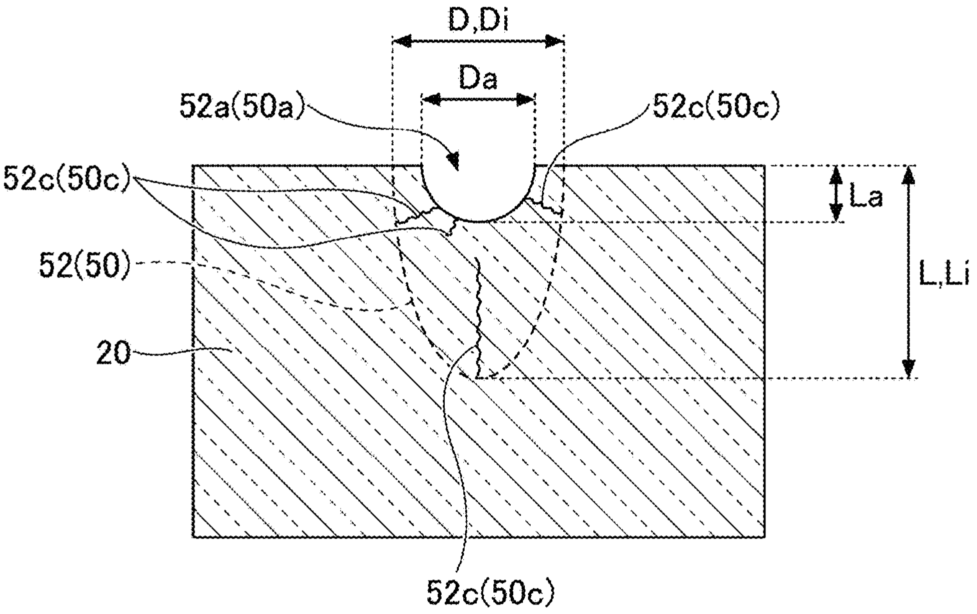
FIG. 5C is a diagram illustrating a structure of a variation of the heterogeneous region, corresponding to FIG. 5A.

FIG. 5C illustrates an example of a structure of a variation of the heterogeneous regions 50. Similar to FIGS. 5A and 5B, FIG. 5C is a schematic diagram of a cross section of the glass plate cut in the thickness direction at a position of the heterogeneous region 50. As illustrated in FIG. 5C, the heterogeneous region 52 (50) may be a region including a central heterogeneous portion 52$a$ (50$a$) located centrally in the heterogeneous region 52 (50) and cracks 52$c$ (50$c$) formed therearound. In the example illustrated in FIG. 5C, the central heterogeneous portion 50$a$ is a recess formed by removing the material constituting the glass plate from the surface of the glass plate. One or more cracks may be formed in the heterogeneous region 50. The cracks 50$c$ preferably include a crack formed so as to extend from the inside of the central heterogeneous portion 50$a$ to the periphery thereof, and may further include a crack formed apart from the central heterogeneous portion 50$a$. The crack formed apart from the central heterogeneous portion 50$a$ may be formed apart from the central heterogeneous portion 50$a$ in the thickness direction, for example, and may be formed on the axis of the heterogeneous region 50. The crack in the heterogeneous region preferably includes a crack reaching the surface of the glass plate.

In the heterogeneous region 50 in which the cracks 50$c$ are formed around the central heterogeneous portion 50$a$, the length L in the thickness direction of the heterogeneous region 50 may be the length from the surface facing the inside of the vehicle of the glass plate to the deepest position where the cracks 50$c$ extend, and the circle equivalent diameter D of the heterogeneous region 50 in plan view may be the diameter of the smallest circle in which the range in which the cracks 50$c$ extend is contained in plan view.

The central heterogeneous portion 50$a$ is a portion directly formed by laser irradiation for forming the heterogeneous region 50, and may have a diameter Da close to the laser irradiation diameter. In contrast, the cracks 50$c$ may be formed during or immediately after the central heterogeneous portion 50$a$ is formed by laser irradiation. When the central heterogeneous portion 50$a$ is a recess, the recess may be an ablation portion formed by laser ablation.

The circle equivalent diameter Da in plan view of the central heterogeneous portion 50$a$, that is, the diameter of a circle having the same area as the area of the central heterogeneous portion 50$a$ in plan view, may be preferably 10 μm or more and 200 μm or less, and more preferably 20 μm or more and 100 μm or less. The length La in the thickness direction of the central heterogeneous portion 50$a$ may be preferably more than 0 μm and 200 μm or less, and more preferably 5 μm or more and 50 μm or less. The ratio (La/Da) may be preferably 1 or less, and more preferably 0.8 or less. The lower limit of (La/Da) is not particularly limited, but (La/Da) may be more than 0, and for example, 0.05 or more.

The position in the thickness direction (depth position) of the heterogeneous region 50 is preferably 0 μm or more and 200 μm or less from the surface facing the inside of the vehicle. The depth position refers to a length from the surface facing the inside of the vehicle to an end of the heterogeneous region 50 near the surface facing the inside of the vehicle, in the thickness direction. When the depth position is 0 μm, the heterogeneous region 50 reaches the surface facing the inside of the vehicle. When the heterogeneous region 50 reaches the surface facing the inside of the vehicle, it is preferable because it can perform its function better on the surface of the glass plate and promotes proper cracking at the time of collision.

One or more of the following may be the same or different between the first heterogeneous region 51 and the second heterogeneous region 52: shape, the length L in the thickness direction, the maximum circle equivalent diameter D, the length Li in the longitudinal direction and the diameter Di of the heterogeneous region itself, and the tilt angle θ and the distribution states thereof.

When the glass plates 10 and 20 constituting the laminated glass 1 are float glass, the heterogeneous regions 50, 50, . . . are preferably formed in the vicinity of the surface (hereinafter referred to as bottom surface) that was in contact with molten metal, for example, molten tin or molten tin alloy at the time of manufacture, among the two main surfaces of the glass plate 10. This point will be described below.

The float method is a method of forming molten glass by floating it on molten metal such as molten tin in a float bath. Here, the bottom surface that was in contact with the molten tin contains tin in the vicinity of the surface, while the top surface, which is the main surface on the opposite side of the bottom surface, that was not in contact with the molten tin contains almost no tin. On the top surface that contains almost no tin, ion exchange reaction between sodium ions in the glass and hydrogen ions in the outside air proceeds, and a surface hydration layer is gradually formed. Because the hardness of the surface hydration layer is low, the fragility of the top surface decreases over time, and cracks are less likely to form and grow. Therefore, even when the heterogeneous regions 50, 50, . . . are formed on the top surface side, the fracture strength increases over time. As a result, it may be difficult for the laminated glass 1 to initiate cracking when a person such as a pedestrian collides with an automobile, and the function of protecting a person may not be sufficient. In contrast, on the bottom surface containing tin, the ion exchange reaction between hydrogen ions and sodium ions is inhibited by the effect of tin, which is an asymmetric ion, and the formation of the surface hydration layer is difficult to proceed. Therefore, by forming the heterogeneous regions 50, 50, . . . in the vicinity of the bottom surface, the fracture strength does not readily change over time, and the function of protecting a person can be maintained for a long period of time.

From the above, in the present embodiment, it is desirable to form the heterogeneous regions 50, 50, . . . in the vicinity of the bottom surface containing a large amount of tin. In the manufacturing of the laminated glass 1, it is preferable that the glass plates 10 and 20 are arranged so that the surfaces facing the inside of the vehicle (the second surface F2 and the fourth surface F4) respectively become the bottom surfaces. In addition, in the bottom surface containing a large amount of metal such as tin, the light absorption particularly in the UV region is significantly improved. Therefore, when the heterogeneous regions 50, 50, . . . are formed, by performing the laser irradiation from the bottom surface side, there is also an advantage that the processing can be performed with lower energy irradiation.

The bottom surface that contains a large amount of tin and the top surface that contains almost no tin can be discriminated by measuring the tin concentration on both surfaces using, for example, a tin surface measuring instrument TinCheck manufactured by Bohle Ltd. On the bottom surface, a tin containing layer having a thickness of 5 to 15 μm can be detected by quantitatively measuring the tin concentration using an X-ray fluorescence method or an EPMA method.

When obtaining the distribution of the strength (fracture stress) (calculation method will be described later) of the surface facing the inside of the vehicle (the second surface F2 and/or the fourth surface F4) of the glass plate of the laminated glass 1 obtained according to the present embodiment, the maximum value of the strength may be preferably 350 MPa or less, and more preferably 250 MPa or less. The minimum value of the strength may be preferably 60 MPa or more, and more preferably 80 MPa or more. When the maximum value is 350 MPa or less, the laminated glass 1 is likely to crack at the time of collision, and the effect of reducing the impact on a person can be improved. When the minimum value is 60 MPa or more, the destruction of the laminated glass 1 by flying gravel can be decreased.

Figure 6:
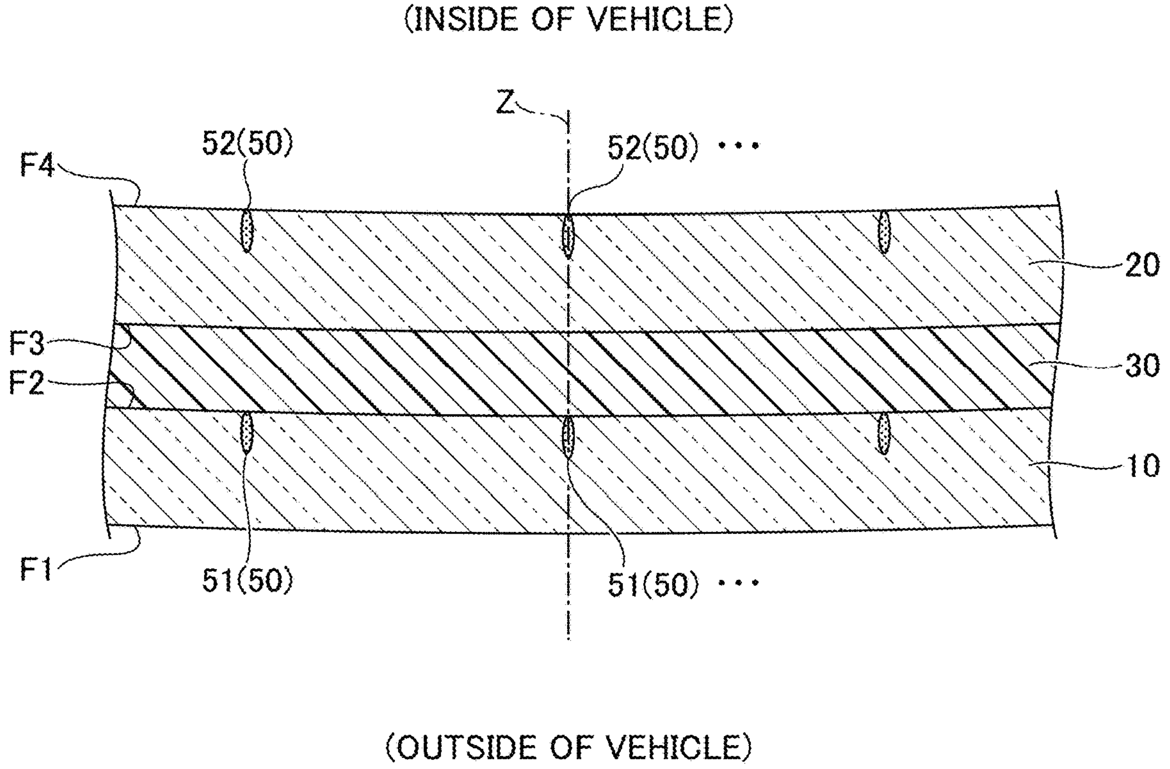
FIG. 6 is a diagram illustrating a variation of the laminated glass, corresponding to FIG. 4.

FIG. 6 illustrates a variation of the arrangement of the heterogeneous regions 50, 50, . . . . As in the example illustrated in FIG. 6, the first heterogeneous regions 51, 51, . . . and the second heterogeneous regions 52, 52, . . . may be overlapped in plan view. In other words, both the first heterogeneous regions 51 and the second heterogeneous regions 52 may be arranged on one straight line Z parallel to the thickness direction. When the first heterogeneous regions 51 and the second heterogeneous regions 52 are overlapped in plan view, it is preferable because a crack is likely to develop in the thickness direction at the time of collision between the automobile 100 and the person 200.

Figure 7:
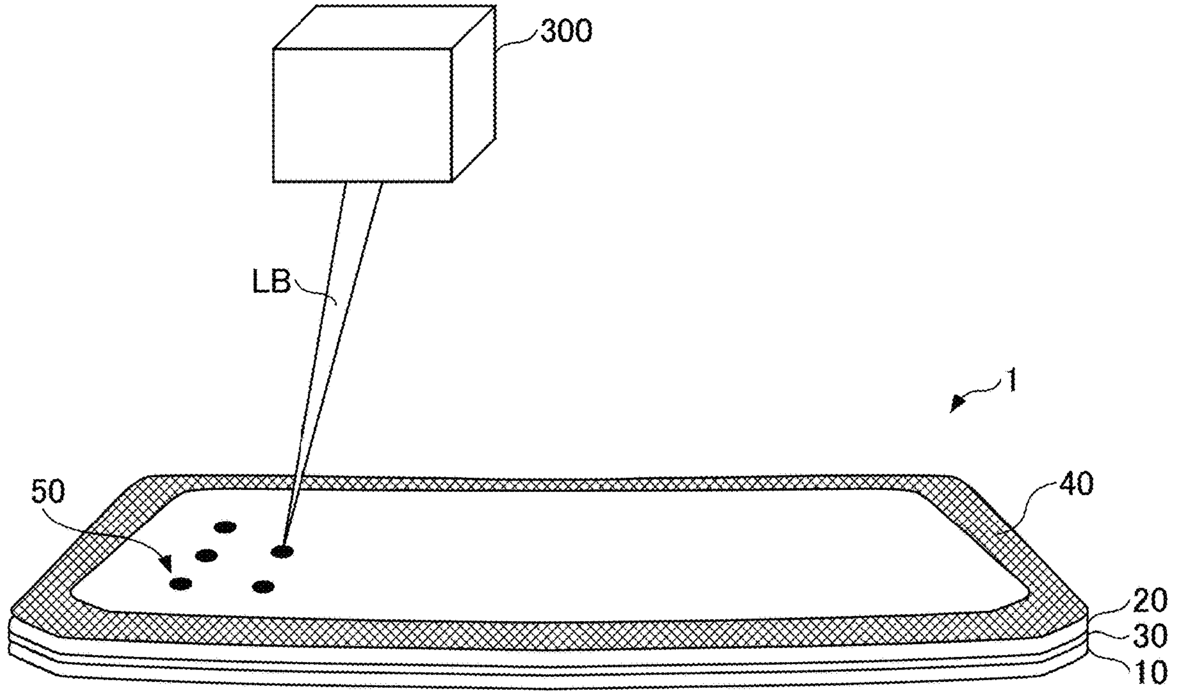
FIG. 7 is a schematic diagram of a laser beam irradiation device.

As described above, the heterogeneous regions 50, 50, . . . are formed using a laser. Because the laser beam has a high directivity or convergence property and can irradiate a small spot diameter (diameter at a focusing position), the heterogeneous region 50 can be formed with a precise size and arrangement by locally heating a minute region. FIG. 7 schematically illustrates a laser beam irradiation device 300 for forming the heterogeneous regions 50, 50, . . . . The main surface of a glass plate is irradiated with the laser beam LB emitted from the laser beam irradiation device 300. In the example illustrated in FIG. 7, the laser beam LB is emitted from the inside of the vehicle of the laminated glass 1 (the side of the fourth surface F4), but the laser beam LB may be emitted from the outside of the vehicle of the laminated glass 1 (the side of the first surface F1) or from both sides.

The laser beam LB is emitted under a condition that the inside of the glass plate can be focused. More specifically, the laser beam LB is emitted under a condition that the inside of the first glass plate near the second surface F2 and/or the inside of the second glass plate near the fourth surface F4 can be focused. Accordingly, the inside of the glass plate is preferentially heated, and a minute region inside the glass plate can be heterogenized to form the heterogeneous region.

In the emitting of the laser beam LB, nonlinear absorption may be used or linear absorption may be used. When the nonlinear absorption is used, the photon density may be $1\times10^{8}$ W/cm$^2$ or more and $1\times10^{14}$ W/cm$^2$ or less. In the nonlinear absorption, multiphoton absorption occurs. The probability of the multiphoton absorption in the nonlinear absorption dramatically increases with higher photon density. For example, the probability of two-photon absorption is proportional to the square of the photon density. In the case of the nonlinear absorption, by selecting a wavelength with small linear absorption, it is possible to selectively absorb light only in the condensing section, so that the heterogeneous region 50 is readily formed deep inside the glass plate.

In the linear absorption, one-photon absorption occurs at an arbitrary position in the thickness direction of the glass plate depending on the photon density. The one-photon absorption is proportional to the photon density. In addition, the intensity of the laser beam LB is attenuated according to Lambert-Beer's law. That is, when the intensity of the laser beam LB changes from $I_0$ to I while the laser beam LB travels a distance E (unit [cm]) through the glass plate, the equation $I=I_0\times\exp(-\alpha\times E)$ is established, where the absorption coefficient of the glass plate is $\alpha$ (unit [cm$^{-1}$]). From the viewpoint of absorbing the laser beam LB inside the glass plate, it is preferable to irradiate the laser beam LB so that the absorption coefficient $\alpha$ is more than 0 and less than 100. In the case of the linear absorption, even for colored glass, for example, the size and shape of the heterogeneous region 50 can be readily controlled by appropriately selecting the absorption coefficient $\alpha$. In the case of the linear absorption, the heterogeneous region appearing on the surface of the glass plate is readily formed.

The wavelength of the laser beam LB, although it depends on the composition or the like of the glass plate included in the laminated glass 1, is preferably such that the laser beam LB can be at least partially transmitted so that the inside of the glass plate can be heated as described above. More specifically, the wavelength of the laser beam LB may be 250 nm or more and 5,000 nm or less, and preferably 310 nm or more and 3,000 nm or less. In the above wavelength range, the absorption coefficient $\alpha$ can be set in an appropriate range, and the presence or absence of ablation, the degree of ablation, and the like can be adjusted.

Examples of the light sources of the laser beam include near-infrared lasers such as Yb fiber lasers (wavelength: 1,000 nm or more and 1, 100 nm or less), Yb disk lasers (wavelength: 1,000 nm or more and 1, 100 nm or less), Nd:YAG lasers (wavelength: 1,064 nm), and high-power semiconductor lasers (wavelength: 808 nm or more and 980 nm or less). The light sources of the laser beam may be UV lasers (wavelength: 310 nm or more and 360 nm or less), green lasers (wavelength: 510 nm or more and 540 nm or less), Ho:YAG lasers (wavelength: 2,080 nm), Er:YAG lasers (2, 940 nm), lasers using mid-infrared parametric oscillators (wavelength: 2, 600 nm or more and 3,450 nm or less), and the like. An LD pumped solid state (diode pumped solid state, DPSS) laser combined with a wavelength conversion element may be used.

The laser beam LB may be emitted using a pulse oscillation method or a continuous oscillation method. The pulse oscillation method is preferable from the viewpoint of reducing unintended damage to the vicinity of the irradiation portion. The operation mode of the pulse is not particularly limited, but a burst pulse mode is preferable because high-output irradiation can be performed and the irradiation time can be shortened. In the case of the pulse oscillation method, a nanosecond pulse laser, a picosecond pulse laser, a femtosecond pulse laser, or the like can be used.

Other conditions for laser beam irradiation may be 0.0001 ns or more and 100 ns or less, a pulse energy of 10 μJ or more and 1,000 μJ or less, a number of irradiations of 1 or more and 1,000 times or less, and a repetition frequency of 1 kHz or more and 10,000 kHz or less. The irradiation angle of the laser beam (the angle with respect to the direction normal to the main surface of the glass plate at the irradiation position) can be set to an irradiation angle corresponding to the tilt angle θ (FIG. 5B) of the heterogeneous region 50 to be formed. The irradiation angle of the laser beam and the tilt angle θ of the heterogeneous region 50 have different values depending on the refraction of the laser beam on the surface of the glass plate. The difference of the angles can be readily calculated from the refractive index of the glass plate. The plurality of heterogeneous regions 50, 50, . . . on the main surface of the glass plate can be formed while changing the irradiation angle of the laser beam.

When the heterogeneous regions 50, 50, . . . are formed, the laser beam is intermittently irradiated to a plurality of predetermined positions while moving the relative position of the laser beam LB to the laminated glass 1. For example, the laser beam irradiation device 300 can be scanned in the plane direction while fixing the position of the laminated glass 1. In this case, it is preferable to use a scanner (scanning device) such as a galvano-scanner or a polygon scanner. Because the irradiation position of the laser beam LB can be arbitrarily changed three-dimensionally by using the scanning device, it is possible to reliably irradiate the laser beam LB at a predetermined position even on a curved glass plate, for example.

When forming the heterogeneous regions on both the first glass plate 10 and the second glass plate 20, the laser beam LB is scanned over the transparent region 5 to form the first heterogeneous regions 51, 51, . . . in the first glass plate 10, and then the laser beam LB is scanned over the transparent region 5 again to form the second heterogeneous regions 52, 52, . . . in the second glass plate 20. The formation order of the first heterogeneous regions 51, 51, . . . and the second heterogeneous regions 52, 52, . . . may be reversed.

The scanning of the laser beam LB required to obtain the laminated glass 1 as the final product is one time, and the heterogeneous regions may be formed in both the first glass plate 10 and the second glass plate 20. In this case, during one scanning, the laser beam LB is condensed at two or more different positions in the optical axis direction, that is, both in the first glass plate 10 and the second glass plate 20. Specifically, it is preferable to condense and irradiate the laser beam LB using a multifocal lens or a multifocal diffractive optical element. Thus, the time required for the scanning of the laser beam LB can be shortened. This method is suitable for obtaining a configuration (FIG. 6) in which the first heterogeneous region 51 and the second heterogeneous region 52 are arranged so as to overlap each other when viewed in plan view.

As illustrated in FIGS. 5A and 5B, the laminated glass 1 according to the present embodiment can be in a configuration in which ablation by the laser beam does not occur or hardly occurs, that is, the irradiation with the laser beam LB can be performed under a condition in which ablation does not occur or hardly occurs in the glass plate. Ablation refers to a phenomenon in which a part of the material of the glass plate is removed from the surface of the glass plate by the irradiation with the laser beam LB. When ablation occurs, the surface of the glass plate becomes rough, which may obstruct the visibility of the outside of the automobile through the laminated glass 1. However, in the present embodiment, the condition of the laser beam LB irradiation can be adjusted so that ablation does not occur, and in this case, the obstruction to the visibility can be reduced. In the laminated glass 1 according to the present embodiment, "ablation by the laser beam hardly occurs" includes cases where ablation having a depth of less than 1 μm is caused by the laser beam.

In the laminated glass 1 according to the present embodiment, ablation by the laser beam may occur, and for example, as described with reference to FIG. 5C, the central heterogeneous portion 50*a* in the heterogeneous region 50 may be formed as the ablation portion. When the central heterogeneous portion 50*a* is the ablation portion, the central heterogeneous portion 50*a* can be readily recognized by an ordinary inspection means during inspection of a product, when compared with a heterogeneous region such as a melting mark, for example, and inspection can be facilitated.

In the laminated glass 1 according to the present embodiment, the arithmetic mean roughness Ra of the roughness curve specified in JIS B 0601-2013 of the second surface F2 of the first glass plate 10 and the fourth surface F4 of the second glass plate 20 can be 0.1 nm or more and 1,000 nm or less at least in the transparent region 5.

As described above, the heterogeneous region 50 in the laminated glass 1 according to the present embodiment may be a region including the central heterogeneous portion 50*a* and the cracks 50*c* formed around the central heterogeneous portion (FIG. 5C). When the heterogeneous region 50 is formed, the central heterogeneous portion is directly formed by laser irradiation as described above, and the cracks are formed simultaneously with the formation or immediately after the formation.

Figure 8B:
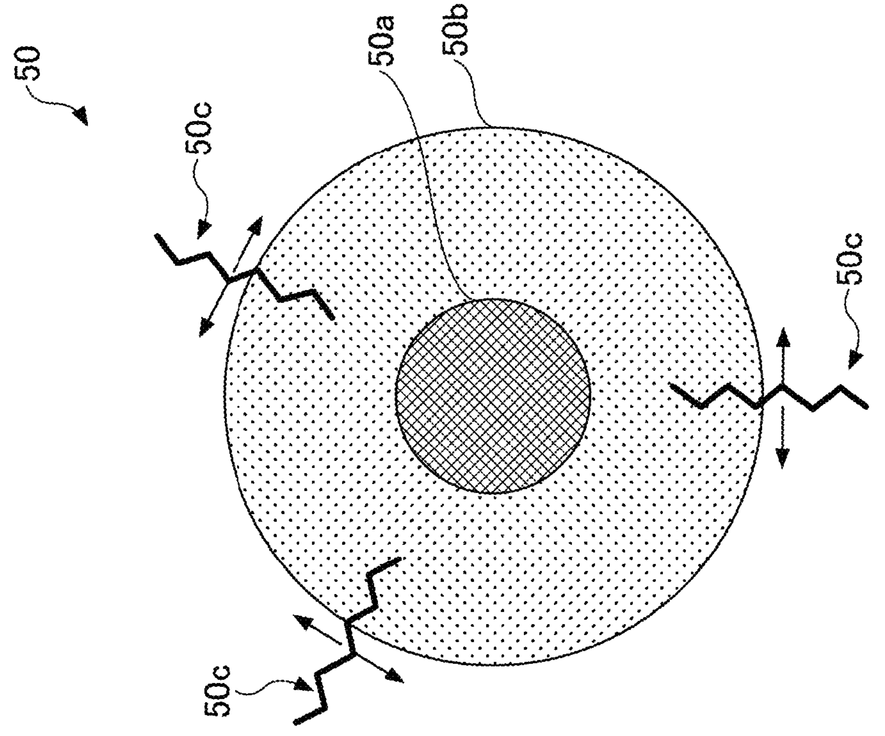
FIGS. 8A and 8B are diagrams for explaining an example of forming a crack.
Figure 8A:
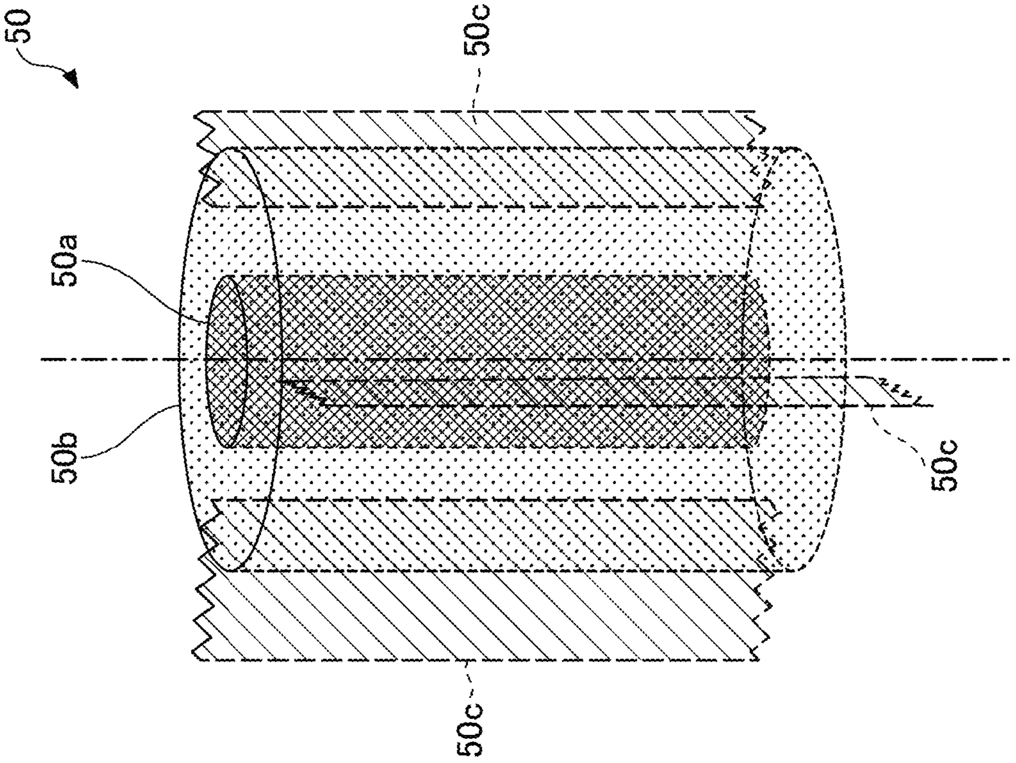
Figure 9B:
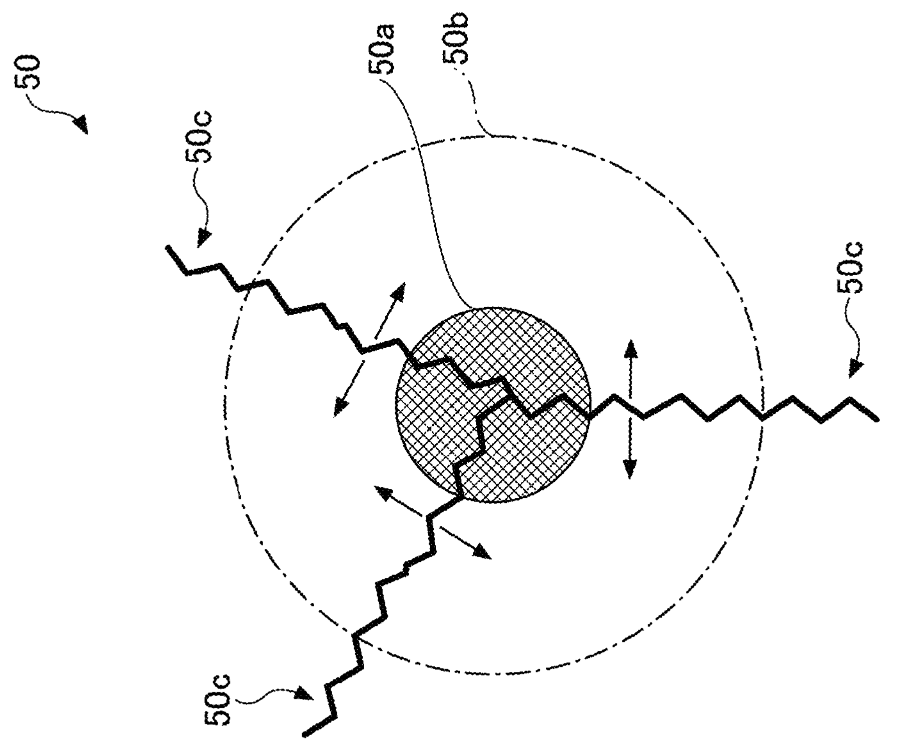
FIGS. 9A and 9B are diagrams for explaining an example of forming a crack.
Figure 9A:
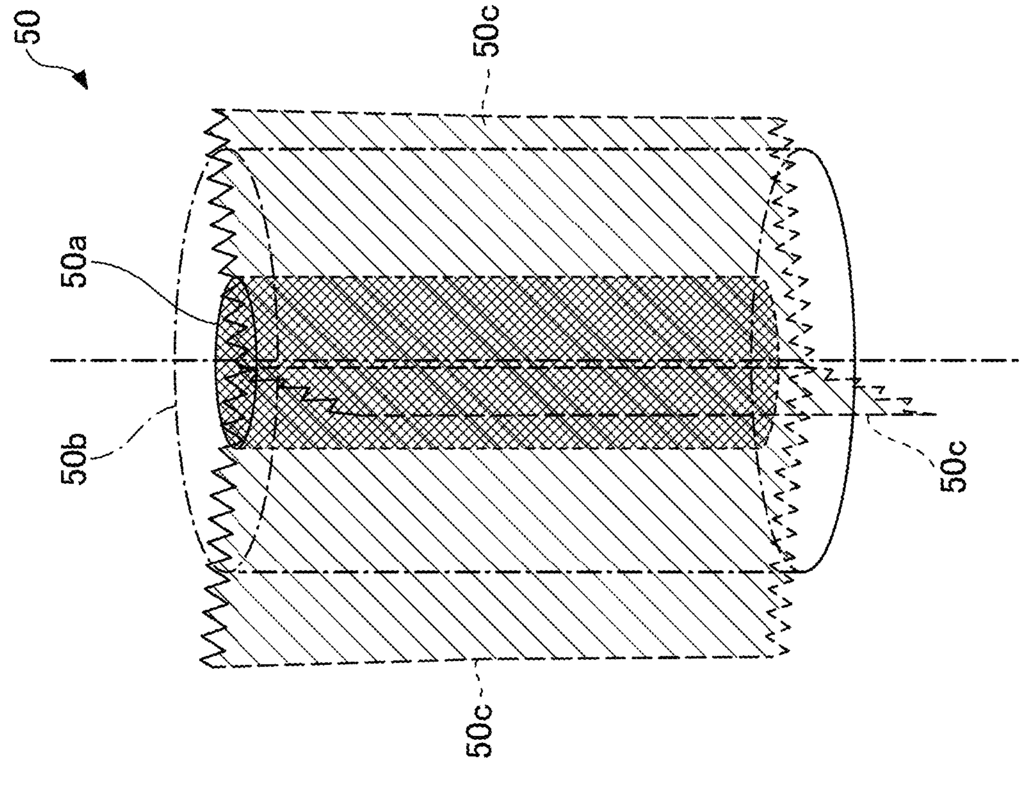

Here, the formation of the cracks in the heterogeneous region 50 having the cylindrical central heterogeneous portion 50*a* as an example will be described with reference to FIGS. 8A, 8B, 9A, and 9B. FIGS. 8A and 8B illustrate a state in which the cracks are generated simultaneously with the formation of the central heterogeneous portion 50*a* by laser irradiation or immediately after the formation of the central heterogeneous portion 50*a*. FIGS. 9A and 9B illustrate a state in which the cracks 50*c* develop after the state of FIGS. 8A and 8B. FIG. 8A and FIG. 9B are perspective views of a portion of the glass plate including the central heterogeneous portion 50*a*. FIG. 8B and FIG. 9B are views of the surface of the glass plate viewed from above. Tensile stress is generated in the minute central heterogeneous portion 50*a* formed by heating by irradiation with laser beam, and compressive stress is generated in a surrounding affected region 50*b* against the tensile stress, and tensile stress is generated in the surrounding region, and the cracks 50*c* are generated by the tensile stress (FIGS. 8A and 8B). The cracks 50*c* may have a length in the thickness direction. Thereafter, the cracks 50*c* develop from the affected region 50*b* into the central heterogeneous portion 50*a* while causing stress relaxation of the glass plate (FIGS. 9A and 9B).

Thus, because the laminated glass 1 includes the cracks 50*c* arising from the central heterogeneous portion 50*a*, the initiation of cracking at the time of collision between an automobile and a person is further promoted, and the effect that the laminated glass 1 can break properly can be improved.

According to an embodiment of the present invention, a method of manufacturing a glass plate for an automobile window is provided. The method includes: forming a plurality of heterogeneous regions by a laser in a vicinity of a surface of the glass plate in the glass plate, the surfaces facing the inside of the vehicle, being spaced apart in a plane direction, wherein a ratio of a length in a thickness direction to a circle equivalent diameter in plan view of the heterogeneous regions is 2 or more and 1,000 or less.

According to an embodiment of the present invention, a method of manufacturing a laminated glass for an automobile window, the laminated glass comprising a first glass plate, an intermediate film, and a second glass plate in this order from outside of a vehicle to inside of the vehicle, is provided. The method includes: forming a plurality of heterogeneous regions by a laser in a vicinity of surfaces of the first glass plate and/or the second glass plate, the surfaces facing the inside of the vehicle, being spaced apart in a plane direction, wherein a ratio of a length in a thickness direction to a circle equivalent diameter in plan view of the heterogeneous regions is 2 or more and 1,000 or less.

According to an embodiment of the present invention, a method of manufacturing a laminated glass for an automobile window, the laminated glass comprising a first glass plate, an intermediate film, and a second glass plate in this order from outside of a vehicle to inside of the vehicle, is provided. The method includes: forming a plurality of heterogeneous regions by a laser in a vicinity of surfaces of the first glass plate and/or the second glass plate, the surfaces facing the inside of the vehicle, being spaced apart in a plane direction, wherein a ratio of a length in a longitudinal direction to a diameter of a cross section perpendicular to the longitudinal direction of the heterogeneous regions is 2 or more and 1,000 or less.

In the method of manufacturing a laminated glass for an automobile window, the forming of the heterogeneous regions may be performed after the first glass plate and the second glass plate are overlapped with each other via the intermediate film. In this case, the irradiation conditions of the laser beam, particularly the wavelength of the laser beam, are adjusted such that the absorption of the laser beam in the first glass plate and/or the second glass plate is larger than the absorption of the laser beam in the intermediate film. According to the method, when the first heterogeneous regions 51, 51, . . . are formed in the first glass plate 10 and the second heterogeneous regions 52, 52, . . . are formed in the second glass plate 20, the displacement of the plates in a plan view can be prevented.

Furthermore, in the method of manufacturing a laminated glass for an automobile window, the laser beam may be irradiated after the first glass plate and the second glass plate irradiated with the laser beam are bent. Accordingly, it is possible to prevent the shape and size of the heterogeneous regions 50, 50, . . . from being affected in the bending process and the function of the heterogeneous regions 50, 50, . . . from becoming non-uniform depending on the positions in the plane direction.

EXAMPLES

Experimental data will be described below. In the following experimental examples, Examples 1 to 5 are examples, and Example 6 is a comparative example.

<Preparation of Sample for Fracture Stress Measurement>

Example 1

A glass sample (100 mm×100 mm×2 mm thickness) was cut out from a glass plate having a composition of soda-lime silicate glass obtained by the float method in the same manner as in a commonly used mass production process, and laser irradiation was performed at one location in the center of the plane of the glass sample from the top surface side. Thus, one heterogeneous region was formed in the vicinity of the bottom surface of the glass sample. Table 1 presents laser irradiation conditions. In the irradiation conditions, “number of irradiation” is the number of times of the laser irradiation. “angle of irradiation” is an angle with respect to the direction normal to the top surface (Example 1) or the bottom surface (Examples 2 to 5) of the glass plate at the irradiation position. When the irradiation angle is 0°, it means that the laser is irradiated in the direction normal to the incident plane (the top surface or the bottom surface). In Example 1, the heterogeneous region was formed by laser irradiation at an irradiation angle of 0°.

The laser processing apparatus used for laser irradiation consists of a laser beam irradiation device (LD pumped solid state laser) and a galvano-scanner as a scanning device. The laser processing apparatus capable of irradiating laser beams at various angles was used although the apparatus itself is fixed in position. The aperture and working distance of the lens were set so that the spot diameter of the laser beam on the glass plate surface was 32 μm in $1/e^2$ diameter.

The glass sample after laser irradiation was put into an electric heating furnace, and heat treatment was performed at 658° C. for 200 seconds as a heat treatment equivalent to the commonly performed bending process.

Examples 2 to 5

Glass samples of Examples 2 to 5 were obtained in the same manner as in Example 1 except that the laser irradiation conditions were changed as presented in Table 1 (including that the incident plane of the laser was set to the bottom surface). In Example 5, a heterogeneous region was formed by laser irradiation at an irradiation angle of 28.00°. Thus, a heterogeneous region in which the axial direction was tilted by 17.78° with respect to the direction normal to the glass plate surface was obtained.

Example 6

A glass sample was obtained in the same manner as in Example 1 except that the laser irradiation was not performed.

<Shape Measurement of Heterogeneous Region>

Heterogeneous regions formed in the vicinity of the bottom surface of the glass samples of Examples were photographed from the side of the bottom surface where the heterogeneous regions were formed using a digital microscope VHX-6000 manufactured by Keyence corporation. The diameter Di of the heterogeneous regions was determined based on the photographed images. Further, the contour of the heterogeneous regions in the cross section cut in the thickness direction of the glass plate was determined by one-dimensional analysis using a laser microscope VK-X3000 manufactured by Keyence corporation, and the length Li of the heterogeneous regions was determined based on the analysis. In Examples 1 to 4, because the heterogeneous regions are not tilted, the length Li in the longitudinal direction of the heterogeneous regions is the same as the length L in the thickness direction, and the diameter Di of the cross section perpendicular to the longitudinal direction of the heterogeneous regions is the same as the circle equivalent diameter D in plan view. The results are presented in Table 1.

<Measurement of Strength (Fracture Stress)>

Ten glass samples (100 mm×100 mm×2 mm thickness) manufactured as described above were prepared, and the strength of each glass sample was measured as fracture stress (MPa). The fracture stress was measured by R30 in accordance with ISO 1288-5 (2016). Specifically, using a support ring of 60 mm diameter and a load ring of 12 mm diameter, a load was applied by the load ring at a load speed of 0.3 mm per minute, and the fracture load was measured. The load was applied from the top surface side of the glass plate with the load ring arranged on the top surface side. The fracture stress was obtained using the equation described in ISO 1288-5 (2016). The results are presented in Table 1.

The maximum value and the minimum value were recorded from the data of strength of the above ten glass samples, and the average value was calculated and recorded.

As presented in Table 1, in Examples 1 to 5 in which the heterogeneous regions were provided having the shape in which the ratio (Li/Di) of the length to the diameter is 2 to 1,000, the maximum value of the fracture stress was 350 MPa or less, and the minimum value was 60 MPa or more. In contrast, in Example 6 in which the heterogeneous regions were not provided, the maximum value of the fracture stress was over 350 MPa.

<Preparation of Sample for External Visibility Evaluation>

A glass sample (300 mm×300 mm×2 mm thickness) was cut out from a glass plate having a composition of soda lime silicate glass obtained by the float method, and laser irradiation was performed from the top surface side (Example 1)

or from the bottom surface side (Examples 2 to 5). The irradiation was performed intermittently at 81 points scattered in a square grid pattern of 30 mm pitch. The laser irradiation conditions were as presented in Table 1. The glass sample after the laser irradiation was put into an electric heating furnace, and heat treatment was performed at 658° C. for 200 seconds as a heat treatment equivalent to the commonly performed bending process.

Two glass samples subjected to the laser irradiation and the heat treatment were laminated with an intermediate film (PVB resin) interposed therebetween in such a manner that the bottom surfaces of the glass samples face the same direction (so that the bottom surfaces of both glass samples face upward) and pressed together to form a laminated glass. A laminated glass sample was obtained in which a glass sample having a thickness of 2 mm, an intermediate film having a thickness of 0.76 mm, and a glass sample having a thickness of 2 mm were laminated. In Example 6, a laminated glass sample was obtained in the same manner as in Examples 1 to 5 except that the laser irradiation was not performed.

<External Visibility Evaluation>

The obtained laminated glass was installed at a position 400 mm away from the evaluator with the surface facing the inside of the vehicle of the glass plate facing the evaluator's face. The visibility of the image on the opposite side of the laminated glass (outside of the vehicle) under natural light was evaluated. The evaluation criteria were as follows.

⊚: No bright spot is visible at all.

○: There is an area where a bright spot is slightly visible.

Δ: Periodic weak bright spots are visible overall.

x: Periodic strong bright spots are visible overall.

The evaluation of each Example is presented in Table 1.

According to the above, it has been found that the laminated glasses for automobile windows of Examples 1 to 5, in which a plurality of heterogeneous regions formed by a laser are provided in a vicinity of the surfaces of the first glass plate and/or the second glass plate, the surfaces facing the inside of the vehicle, being spaced apart in a plane direction, can provide a technology that reduces an impact on a person when an automobile collides with the person, while not obstructing the visibility of the outside of the automobile by the occupant of the automobile.

What is claimed is:

1. A laminated glass for an automobile window, the laminated glass comprising a first glass plate, an intermediate film, and a second glass plate in this order from outside of a vehicle to inside of the vehicle, wherein a plurality of heterogeneous regions formed by a laser are provided in a vicinity of a surface of the first glass plate, a surface of the second glass plate, or the surfaces of the first glass plate and the second glass plate, the surfaces facing the inside of the vehicle, being spaced apart in a plane direction, a ratio of a length in a thickness direction to a circle equivalent diameter in plan view of the heterogeneous regions is 2 or more and 1,000 or less.

2. The laminated glass for an automobile window according to claim 1, wherein the circle equivalent diameter in plan view of the heterogeneous regions is 0.01 μm or more and 200 μm or less, and the length in the thickness direction is 0.1 μm or more and 2,000 μm or less.

3. A laminated glass for an automobile window, the laminated glass comprising a first glass plate, an intermediate film, and a second glass plate in this order from outside of a vehicle to inside of the vehicle, wherein

TABLE 1

| | LASER IRRADIATION CONDITIONS | | | | | | | HETEROGENEOUS REGION CHARACTERISTICS | | | | STRENGTH (FRACTURE STRESS) | | | |
|---|---|---|---|---|---|---|---|---|---|---|---|---|---|---|---|
| | INCIDENCE PLANE | WAVELENGTH [nm] | PULSE WIDTH [ns] | PULSE ENERGY [μJ] | NUMBER OF IRRADIATION | REPETITION FREQUENCY [kHz] | ANGLE OF IRRADIATION [deg] | DIAMETER Di [μm] | LENGTH Li [μm] | Li/Di | ANGLE θ [deg] | MAXIMUM VALUE [MPa] | MINIMUM VALUE [MPa] | AVERAGE VALUE (N10) [MPa] | EXTERNAL VISIBILITY |
| EXAMPLE 1 | TOP SURFACE | 532 | 20 | 192 | 10 | 40 | 0 | 110 | 310 | 2.8 | 0 | 104 | 92 | 100 | ○ |
| EXAMPLE 2 | BOTTOM SURFACE | 355 | 20 | 80 | 6 | 100 | 0 | 40 | 696 | 17.4 | 0 | 193 | 113 | 165 | ⊚ |
| EXAMPLE 3 | BOTTOM SURFACE | 355 | 20 | 120 | 8 | 75 | 0 | 34 | 565 | 16.6 | 0 | 115 | 98 | 105 | ⊚ |
| EXAMPLE 4 | BOTTOM SURFACE | 355 | 20 | 80 | 20 | 40 | 0 | 41 | 539 | 13.1 | 0 | 108 | 89 | 102 | ⊚ |
| EXAMPLE 5 | BOTTOM SURFACE | 355 | 20 | 130 | 40 | 40 | 28.00 | 61 | 550 | 9.0 | 17.78 | 112 | 99 | 105 | ⊚ |
| EXAMPLE 6 | — | — | — | — | — | — | — | — | — | — | — | 475 | 128 | 248 | ⊚ |

a plurality of heterogeneous regions formed by a laser are provided in a vicinity of a surface of the first glass plate, a surface of the second glass plate, or the surfaces of the first glass plate and the second glass plate, the surfaces facing the inside of the vehicle, being spaced apart in a plane direction, a ratio of a length in a longitudinal direction to a diameter of a cross section perpendicular to the longitudinal direction of the heterogeneous regions is 2 or more and 1,000 or less.

4. The laminated glass for an automobile window according to claim 3, wherein the diameter of the heterogeneous regions is 0.01 μm or more and 200 μm or less, and the length is 0.1 μm or more and 2,000 μm or less.

5. The laminated glass for an automobile window according to claim 3, wherein the heterogeneous regions include tilted heterogeneous regions, a longitudinal direction of the tilted heterogeneous regions forms an angle of more than 0° and 60° or less with respect to a direction normal to a main surface of the first glass plate, a main surface of the second glass plate, or the main surfaces of the first glass plate and the second glass plate, in which the heterogeneous regions are provided.

6. The laminated glass for an automobile window according to claim 5, wherein an angle of a longitudinal direction of the heterogeneous regions with respect to the direction normal to the main surface of the first glass plate, the main surface of the second glass plate, or the main surfaces of the first glass plate and the second glass plate, in which the heterogeneous regions are provided is distributed within a range of 0° or more and 60° or less.

7. The laminated glass for an automobile window according to claim 1, wherein a pitch of the heterogeneous regions in the plane direction is 1 mm or more and 200 mm or less.

8. The laminated glass for an automobile window according to claim 1, wherein the heterogeneous regions are regions in which at least a virtual temperature is different from regions around the heterogeneous regions.

9. The laminated glass for an automobile window according to claim 1, wherein either or both the first glass plate and the second glass plate provided with the heterogeneous regions are float glass, and the heterogeneous regions are provided in a vicinity of a molten metal contact surface of the float glass.

10. The laminated glass for an automobile window according to claim 1, wherein the heterogeneous regions extend to the surface facing the inside of the vehicle.

11. The laminated glass for an automobile window according to claim 1, wherein both of the first glass plate and the second glass plate include the heterogeneous regions, and the heterogeneous regions formed in the first glass plate and the heterogeneous regions formed in the second glass plate overlap in plan view.

12. An automobile comprising:

the laminated glass for an automobile window of claim 1; and an opening to which the laminated glass for the automobile window is installed.

13. The laminated glass for an automobile window according to claim 1, wherein the ratio of a length in a thickness direction to a circle equivalent diameter in plan view of the heterogeneous regions is 3 or more and 100 or less.

14. The laminated glass for an automobile window according to claim 3, wherein the ratio of a length in a longitudinal direction to a diameter of a cross section perpendicular to the longitudinal direction of the heterogeneous regions is 3 or more and 100 or less.

15. The laminated glass for an automobile window according to claim 1, wherein the ratio of a length in a thickness direction to a circle equivalent diameter in plan view of the heterogeneous regions is 5 or more and 100 or less.

16. The laminated glass for an automobile window according to claim 3, wherein the ratio of a length in a longitudinal direction to a diameter of a cross section perpendicular to the longitudinal direction of the heterogeneous regions is 5 or more and 100 or less.

17. The laminated glass for an automobile window according to claim 1, wherein the ratio of a length in a thickness direction to a circle equivalent diameter in plan view of the heterogeneous regions is 10 or more and 50 or less.

18. The laminated glass for an automobile window according to claim 3, wherein the ratio of a length in a longitudinal direction to a diameter of a cross section perpendicular to the longitudinal direction of the heterogeneous regions is 10 or more and 50 or less.

19. The laminated glass for an automobile window according to claim 1, wherein each of the heterogeneous regions comprises a central heterogeneous portion and cracks formed therearound, and a ratio of a length in a thickness direction to a circle equivalent diameter in plan view of the central heterogeneous portion is 1 or less.

20. The laminated glass for an automobile window according to claim 3, wherein each of the heterogeneous regions comprises a central heterogeneous portion and cracks formed therearound, and a ratio of a length in a thickness direction to a circle equivalent diameter in plan view of the central heterogeneous portion is 1 or less.

21. The automobile according to claim 12, wherein in a state where the laminated glass for an automobile window is installed to the automobile, a longitudinal direction of the heterogeneous regions is parallel to a horizontal direction, or parallel to a direction along a line of sight toward the laminated glass from an eye position of an occupant.

* * * * *